United States Patent
John et al.

(10) Patent No.: US 10,823,106 B1
(45) Date of Patent: Nov. 3, 2020

(54) EARLY PILOT LEAN BURN STRATEGY IN DUAL FUEL ENGINE USING TARGETED PILOT FLAMES

(71) Applicant: Caterpillar Inc., Deerfield, IL (US)

(72) Inventors: Bobby John, Peoria, IL (US); Jonathan W. Anders, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/410,269

(22) Filed: May 13, 2019

(51) Int. Cl.
| F02D 19/10 | (2006.01) |
| F02B 3/10 | (2006.01) |
| F02D 41/40 | (2006.01) |
| F02D 41/30 | (2006.01) |
| F02D 41/00 | (2006.01) |
| F02B 3/12 | (2006.01) |

(52) U.S. Cl.
CPC .............. *F02D 41/403* (2013.01); *F02B 3/10* (2013.01); *F02B 3/12* (2013.01); *F02D 19/10* (2013.01); *F02D 41/0027* (2013.01); *F02D 41/3041* (2013.01); *F02D 41/3047* (2013.01)

(58) Field of Classification Search
CPC .... F02B 3/10; F02B 3/12; F02D 19/10; F02D 41/0027; F02D 41/3047; F02D 41/403
USPC ............ 123/27 GE, 525, 526, 295, 299, 305
See application file for complete search history.

(56) References Cited

U.S. PATENT DOCUMENTS

| 6,032,617 A | 3/2000 | Willi et al. |
| 6,276,334 B1 | 8/2001 | Flynn et al. |
| 6,505,601 B1 | 1/2003 | Jorach et al. |
| 6,561,157 B2 | 5/2003 | zur Loye et al. |
| 6,640,773 B2 | 11/2003 | Ancimer et al. |
| 6,659,071 B2 | 12/2003 | LaPointe et al. |
| 6,854,438 B2 * | 2/2005 | Hilger ................ F02M 21/0269 123/143 B |
| 6,907,870 B2 | 6/2005 | Zur Loye et al. |
| 6,912,992 B2 | 7/2005 | Ancimer et al. |
| 6,915,776 B2 | 7/2005 | zur Loye et al. |
| 7,007,669 B1 | 3/2006 | Willi et al. |

(Continued)

FOREIGN PATENT DOCUMENTS

| DE | 102006014071 B3 | 10/2007 | |
| WO | WO-2011008706 A2 * | 1/2011 | ....... F02D 41/30944 |
| WO | 2012010237 A1 | 1/2012 | |

OTHER PUBLICATIONS

Dawn Hibbard, "Improving Diesel Engine Performance", Kettering University News, Jul. 28, 2011.

(Continued)

*Primary Examiner* — Erick R Solis
(74) *Attorney, Agent, or Firm* — Brannon Sowers & Cracraft (57) ABSTRACT

Operating a dual fuel engine system includes injecting an early shot and a second shot of a liquid fuel into a cylinder after a late closing timing of an intake valve, and producing a first and a second pilot flame based on ignition of the early shot and the second shot of liquid fuel. The early shot of liquid fuel is targeted such that a distribution of ignition points of the first pilot flame is biased outwardly of a combustion bowl in the piston. Propagation of the first and second pilot flames from geometrically distinct ignition locations rapidly increases pressure and temperature in the cylinder to provide fast combustion of a lean mixture of a gaseous fuel and air in a main charge in the cylinder.

19 Claims, 5 Drawing Sheets

(56) References Cited

U.S. PATENT DOCUMENTS

| | | |
|---|---|---|
| 7,574,993 B2 | 8/2009 | Gillespie et al. |
| 7,841,308 B1 | 11/2010 | Muth |
| 8,327,823 B2 | 12/2012 | Courtoy et al. |
| 8,555,852 B2 | 10/2013 | Munshi et al. |
| 10,273,894 B2 | 4/2019 | Tripathi |
| 2005/0120995 A1 | 6/2005 | Tsujimoto et al. |
| 2013/0146037 A1 | 6/2013 | Han et al. |
| 2015/0136047 A1* | 5/2015 | Hou .................. F02D 41/3047 123/3 |
| 2015/0285178 A1 | 10/2015 | John |
| 2016/0177851 A1 | 6/2016 | Gruber et al. |

OTHER PUBLICATIONS

Amin Paykani, "Progress and Recent Trends in Reactivity-controlled Compression Ignition Engines", International Journal of Engine Research, Jul. 2015.

\* cited by examiner

EARLY PILOT LEAN BURN STRATEGY IN DUAL FUEL ENGINE USING TARGETED PILOT FLAMES

TECHNICAL FIELD

The present disclosure relates generally to a combustion strategy in a gaseous and liquid dual fuel internal combustion engine, and more particularly to combusting a lean mixture of gaseous fuel and air based on targeted shots of combustion-initiating liquid fuel.

BACKGROUND

Internal combustion engines are well known and widely used for vehicle propulsion, generation of electrical power, gas compression and liquification, liquid and gas transfer, and in various industrial applications. In a conventional operating scheme, fuel and air is combusted within an engine cylinder to produce a rapid rise in pressure and drive a piston coupled with a crankshaft. Spark-ignited engines typically employ a liquid petroleum distillate fuel such as gasoline, or certain gaseous fuels such as natural gas, methane, propane, and various mixtures. Compression-ignition engines typically utilize fuels such as diesel distillate fuel, biodiesel, and still others. There has been significant research interest in recent years in engines and operating strategies that are flexible with regard to fuel utilization, particularly gaseous fuels. Fuel prices can be fairly dynamic, and various fuels such as gaseous fuels can have desirable combustion or emissions properties which are sought to be exploited.

One type of engine design that allows for operation with different fuel types combines both a diesel distillate fuel and natural gas. Diesel alone is relatively easy to compression ignite, but can produce undesirable emissions. When natural gas is used as a fuel in a compression-ignition engine, the mixture of natural gas and air can fail to ignite, knock, or have combustion stability problems. Moreover, gaseous fuels can have a range of quality depending upon the type of gaseous fuel and its source. Gaseous fuels proportionately higher in methane tend to compression ignite relatively less easily than those containing certain longer chain hydrocarbons, and, as a result, different fuel blends can have varying tendencies to knock, in other words prematurely ignite.

Dual fuel engines employing a combustion-initiating shot of liquid fuel to ignite a larger main charge of gaseous fuel can address some of these problems, making combustion relatively more predictable and controllable. It is generally desirable to utilize as little liquid fuel, such as diesel fuel, as is practicable in such applications since the diesel combustion even while small can still produce undesired emissions and have higher costs than the gaseous fuel. As combustion scientists have experimented with relatively tiny amounts of diesel fuel for igniting a larger charge of gaseous fuel, practical and commercial success has often proven elusive. One example of a dual fuel engine employing a diesel pilot fuel to ignite natural gas is known from U.S. Pat. No. 6,032,617 to Willi et al.

SUMMARY OF THE INVENTION

In one aspect, a method of operating a dual fuel engine system includes moving a piston in a cylinder in a dual fuel engine from a bottom dead center (BDC) position to a top dead center (TDC) position, and injecting an early shot of a liquid fuel into the cylinder prior to completing the moving of the piston to the TDC position. The method further includes producing a first pilot flame based on ignition of the early shot of liquid fuel, and targeting the early shot of liquid fuel in the cylinder such that a distribution of ignition points of the first pilot flame is biased outwardly of a combustion bowl in the piston. The method further includes producing a second pilot flame that propagates outwardly in the cylinder to merge with the first pilot flame, and combusting a stoichiometrically lean mixture of a gaseous fuel and air in the cylinder in a manner responsive to the production of the first pilot flame and the second pilot flame.

In another aspect, a method of combustion in a dual fuel internal combustion engine includes conveying a stoichiometrically lean mixture of a gaseous fuel and air into a cylinder in the dual fuel internal combustion engine, and injecting an early shot of liquid fuel into the cylinder targeted at a rim of a piston during a compression stroke of the piston in an engine cycle. The method further includes injecting a second shot of a liquid fuel into the cylinder after the injection of the early shot, and producing a first pilot flame and a second pilot flame in the cylinder based, respectively, on ignition of the early shot of liquid fuel and the second shot of liquid fuel. The method still further includes propagating the first pilot flame and the second pilot flame within the cylinder, and combusting the stoichiometrically lean mixture of gaseous fuel and air in the cylinder according to a combustion phasing that is based on the propagation of the first pilot flame and the second pilot flame.

In still another aspect, a dual fuel internal combustion engine system includes an engine housing having a cylinder and an intake conduit formed therein, a piston movable within the cylinder between a bottom dead center (BDC) position and a top dead center (TDC) position, and having a rim extending circumferentially around a combustion bowl, and an intake valve. The intake valve is movable between an open position and a closed position to fluidly connect and disconnect the cylinder with the intake conduit. The engine system further includes a gaseous fuel admission valve coupled with the engine housing and structured to admit a gaseous fuel for combustion in a stoichiometrically lean mixture of gaseous fuel and air in the cylinder, and an electronically controlled variable valve actuator coupled with the intake valve. The engine system still further includes at least one electronically controlled liquid fuel injector structured to directly inject an early shot of a liquid fuel into the cylinder in an engine cycle, and a combustion control unit coupled with each of the electronically controlled variable valve actuator and the at least one electronically controlled liquid fuel injector. The combustion control unit is structured to output a variable valve timing command to close the intake valve after commencing moving of the piston from the BDC position to the TDC position in an engine cycle. The combustion control unit is further structured to command production of a first pilot flame in the cylinder by outputting a first fuel injection command to inject an early shot of liquid fuel after the closing of the intake valve and prior to completing the moving of the piston to the TDC position in the engine cycle. The combustion control unit is further structured to command production of a second pilot flame in the cylinder by outputting a second fuel injection command to inject a second shot of liquid fuel. The combustion control unit is further structured to target the early shot of liquid fuel at the rim of the piston, and to target the second shot of liquid fuel within the cylinder, such that the first pilot flame and the second

DETAILED DESCRIPTION

Figure 1:
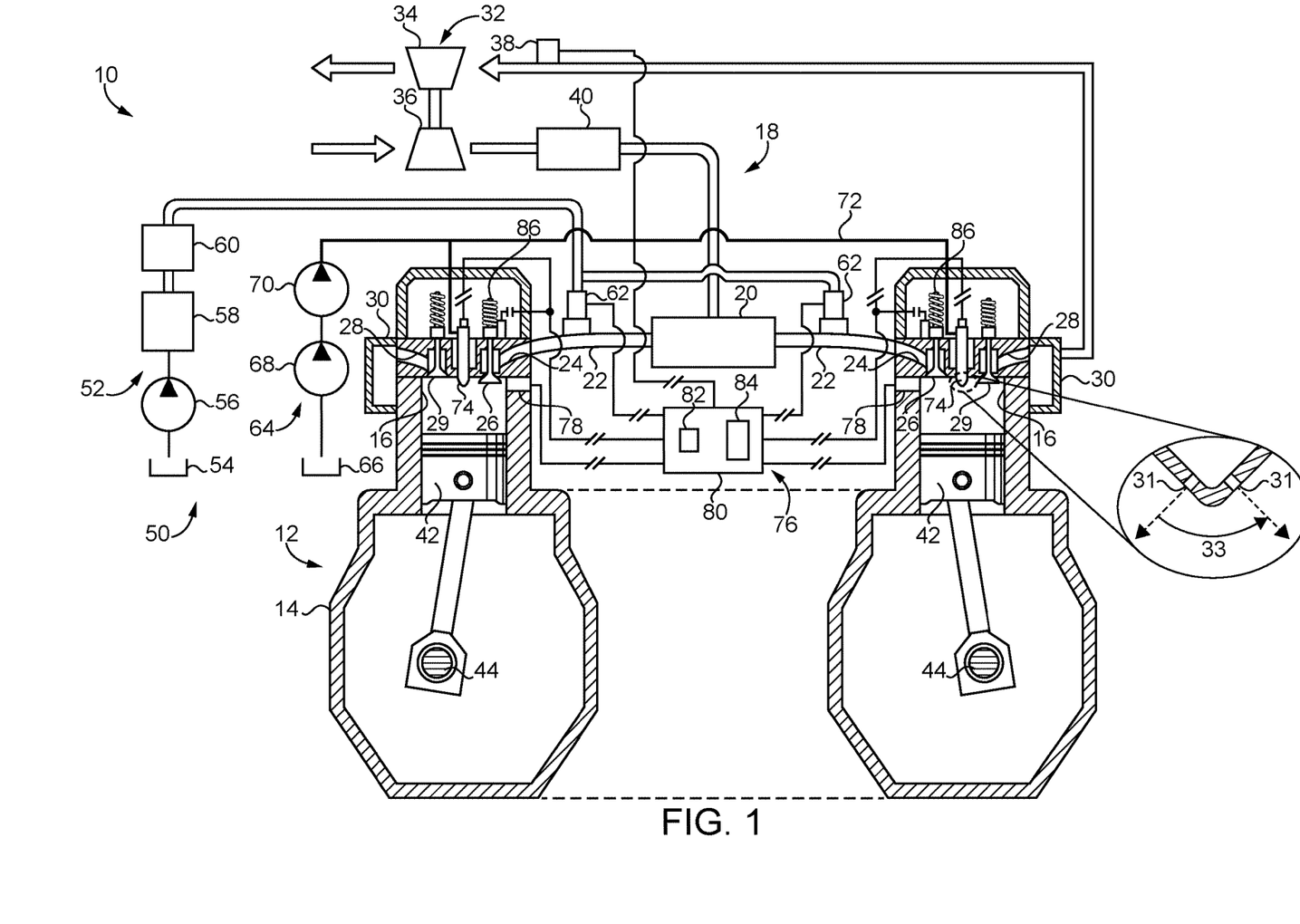
FIG. 1 is a partially sectioned side diagrammatic view of a dual fuel engine system, according to one embodiment.

Referring to FIG. 1, there is shown a dual fuel engine system 10 according to one embodiment, and including an internal combustion engine 12 having an engine housing 14 with a plurality of cylinders 16 formed therein. Internal combustion engine 12 (hereinafter "engine 12") can include a single cylinder, or multiple cylinders, arranged in an in-line configuration, a V-configuration, or in any other suitable arrangement. Discussion herein of a cylinder 16, or other elements, components, or phenomena in the singular should be understood to refer generally to any of a plurality of those except where otherwise indicated or apparent from the context. A piston 42 is positioned within cylinder 16 and structured to reciprocate between a bottom dead center (BDC) position and a top dead center (TDC) position in cylinder 16 to rotate a crankshaft 44 in a generally known manner. Engine 12 will typically operate in a conventional four-cycle pattern.

Dual fuel engine system 10 further includes an intake system 18 having an intake manifold 20 fluidly connected with a plurality of intake runners 22 structured to feed air for combustion to each of cylinders 16. Engine housing 14 has an intake conduit 24 formed therein, and an intake valve 26 is movable between an open position and a closed position to fluidly connect and disconnect cylinder 16 with intake conduit 24. Engine housing 14 further has an exhaust conduit 28 formed therein, and engine 12 includes an exhaust valve 29 movable between an open position and a closed position to fluidly connect and disconnect cylinder 16 with exhaust conduit 28. Exhaust conduit 28 connects to an exhaust manifold 30 in a generally conventional manner. Dual fuel engine system 10 further includes a turbocharger 32 having a turbine 34 structured to receive a flow of exhaust gases from exhaust manifold 30, and operable to rotate a compressor 36 to compress intake air in intake system 18 for delivery to cylinder 16. An electronically controlled waste gate 38 may be positioned fluidly between exhaust manifold 30 and turbine 34 to enable exhaust to be selectively bypassed around or past turbine 34 in a manner that limits boost pressure produced by compressor 36. Waste gate 38 can be understood as an air-fuel ratio control element 38 that can be operated to selectively open to limit compression and therefore density of intake air, or closed to increase compression and therefore density of intake air supplied to cylinder 16 in a manner that generally enables air-fuel ratio to be controlled, the significance of which will be further apparent from the following description. Turbocharger 32 could be a first turbocharger with a second turbocharger positioned downstream of turbocharger 32, and dual fuel engine system 10 could potentially include a plurality of waste gates associated one with each of a plurality of turbines. In another embodiment, an intake airflow control element in the nature of a compressor bypass valve might be provided that enables intake air to bypass compressor 36 to analogously vary a relative pressurization of the intake air for controlling air-fuel ratio. An aftercooler 40 may be positioned downstream of compressor 36 and cools intake air to be supplied to intake manifold 20. Although not shown, engine system 10 could include apparatus for recirculating exhaust, including apparatus for selectively cooling recirculated exhaust.

Dual fuel engine system 10 further includes a dual fuel system 50 having a gaseous fuel subsystem 52 with a gaseous fuel supply 54. Fuel supply 54 could include a cryogenic liquified gaseous fuel supply storing liquified natural gas or another suitable fuel that is gaseous at standard temperature and pressure, such as methane, ethane, biogas, landfill gas, or still another. As further discussed herein dual fuel engine system 10 can be structured to operate at a stoichiometrically lean equivalence ratio of gaseous fuel to air, and further being structured to operate on gaseous fuel having a range of quality including gaseous fuels having a methane number less than 70, potentially less than 60 or still lower, for example. Dual fuel engine system 10 may further be structured to operate at substitution rates greater than 90%, greater than 95% in some instances, and potentially greater than 99%. Substitution rate refers herein to a proportion of fuel energy of gaseous fuel that is provided in place of a fuel energy of liquid fuel that would be used in a liquid-fuel only operating scheme. The liquid fuel used in dual fuel engine system 10 can include diesel distillate fuel, however, the present disclosure is not thereby limited. Gaseous fuel subsystem 52 can further include a cryogenic pump 56, structured to convey gaseous fuel in a liquified state to a vaporizer 58, which thenceforth supplies the gaseous fuel now in a gaseous state to a pressurization pump 60. Other gaseous fuel supply and vaporization equipment could be used different from that depicted in FIG. 1. Gaseous fuel pressurization pump 60 feeds the gaseous fuel to a gaseous fuel admission valve 62 coupled with engine housing 14 and structured to admit the gaseous fuel for combustion in cylinder 16. In the illustrated embodiment a plurality of gaseous fuel admission valves 62 are shown each coupled with an intake runner 22, enabling gaseous fuel supply to be independently varied amongst the plurality of cylinders 16. In other embodiments, gaseous fuel could be admitted to intake manifold 20, or in some instances potentially mixed with intake air upstream of compressor 36.

Dual fuel engine system 10 further includes a liquid fuel subsystem 64 for supplying the liquid fuel and having a liquid fuel supply 66, such as a fuel tank, a fuel transfer pump 68, and a fuel pressurization pump 70. Fuel pressurization pump 70 can supply liquid fuel at a pressure suitable for injection to a common rail 72 or similar common reservoir structured to store a volume of pressurized liquid fuel. In other instances, rather than a common rail so-called unit pumps or the like could be used and each associated with one or more of the plurality of cylinders 16. Common rail 72 feeds pressurized liquid fuel to a plurality of electronically controlled liquid fuel injectors 74 structured to directly inject the liquid fuel into each of the plurality of cylinders 16 as further discussed herein. In the illustrated embodiment one electronically controlled liquid fuel injector is associated with each cylinder 16, however, in other instances each cylinder 16 could be equipped with a plurality of liquid fuel injectors including, for example, a first liquid fuel injector for injecting relatively small pilot quantities of liquid fuel into cylinder 16 during dual fuel operation, and a second liquid fuel injector structured to inject the liquid fuel into cylinder 16 during a diesel-only mode of operation. In still other instances, multiple fuel injectors could be used for injecting liquid fuel at different spray angles, such as for targeting purposes. Cylinder 16 will be equipped with at least one electronically controlled liquid fuel injector.

Dual fuel engine system 10 further includes a combustion control system 76. Combustion control system 76 includes a combustion sensor 78 structured to produce phasing data indicative of a phasing of combustion in cylinder 16 in engine 12. The phasing data may be indicative of a phasing of combustion of a main charge of gaseous fuel ignited by way of a plurality of shots of liquid fuel in an engine cycle. Combustion control system 76 can further be understood to include waste gate 38, or a separate electrical actuator (not shown) for waste gate 38, as well as the various electrical actuators that are associated with gaseous fuel admission valve 62, and liquid fuel injector 74. Combustion control system 76 also includes an electronically controlled variable valve actuator 86 coupled with intake valve 26 and structured to position intake valve 26 to vary a relative position and state of intake valve 26 from engine cycle to engine cycle as further discussed herein. Varying intake valve actuation can vary an effective compression ratio in cylinder 16, for instance closing intake valve 26 late to limit effective compression ratio, and thus limit an increase in cylinder temperature that might otherwise occur during moving piston 42 from its BDC position to its TDC position. A geometric compression ratio of cylinder 16 may be greater than 13:1, typically greater than 14:1, and consistent with conventional diesel compression ratios as engine system 10 can be structured for operation as a conventional diesel engine when desired. Combustion control system 76 further includes an electronic control unit or combustion control unit 80 coupled to combustion sensor 78 and the other electronically controlled components and sensors of dual fuel engine system 10. In one practical implementation strategy combustion sensor 78 can include a pressure sensor exposed to a fluid pressure of cylinder 16 and including a pressure sensor of a generally known type having a deformable element, a strain gauge or the like or still another sensor, having an electrical state such as a voltage or a resistance that varies in response to varying of pressure within cylinder 16. Combustion sensor 78 could be mounted within a cylinder block or within a cylinder head of engine 12 in a generally known manner. Combustion control unit 80 may be structured to receive signals output by combustion sensor 78, or structured to interrogate combustion sensor 78, or otherwise receive electronic data produced by combustion sensor 78, for the control purposes further discussed herein. The phasing data produced by combustion sensor 78 may be data encoded in a fluid pressure signal or a mechanical strain signal or the like. Combustion control unit 80 includes a data processor 82 coupled with a computer readable memory 84. Data processor 82 can be any suitable central processing unit such as a microprocessor or a microcontroller or a field programmable gate array, for instance. Computer readable memory 84 can likewise include any suitable computer readable memory such as RAM, ROM, DRAM, SDRAM, FLASH, a hard drive, or still another. Memory 84 can include recorded thereon computer executable program instructions for operating dual fuel engine system 10, as well as the various maps referenced during execution of control routines according to the present disclosure. Also shown in FIG. 1 is a detailed enlargement showing a plurality of spray orifices 31 formed in a fuel injector nozzle of fuel injector 74. Spray orifices 31 may be from 3 to 6 in number, and oriented at a spray angle 33 less than 130°, and typically between 120° and 130°, although the present disclosure is not thereby limited. Spray orifices 21 may have diameters from about 200 microns or 0.2 millimeters to about 300 microns or 0.3 millimeters.

Figure 2:
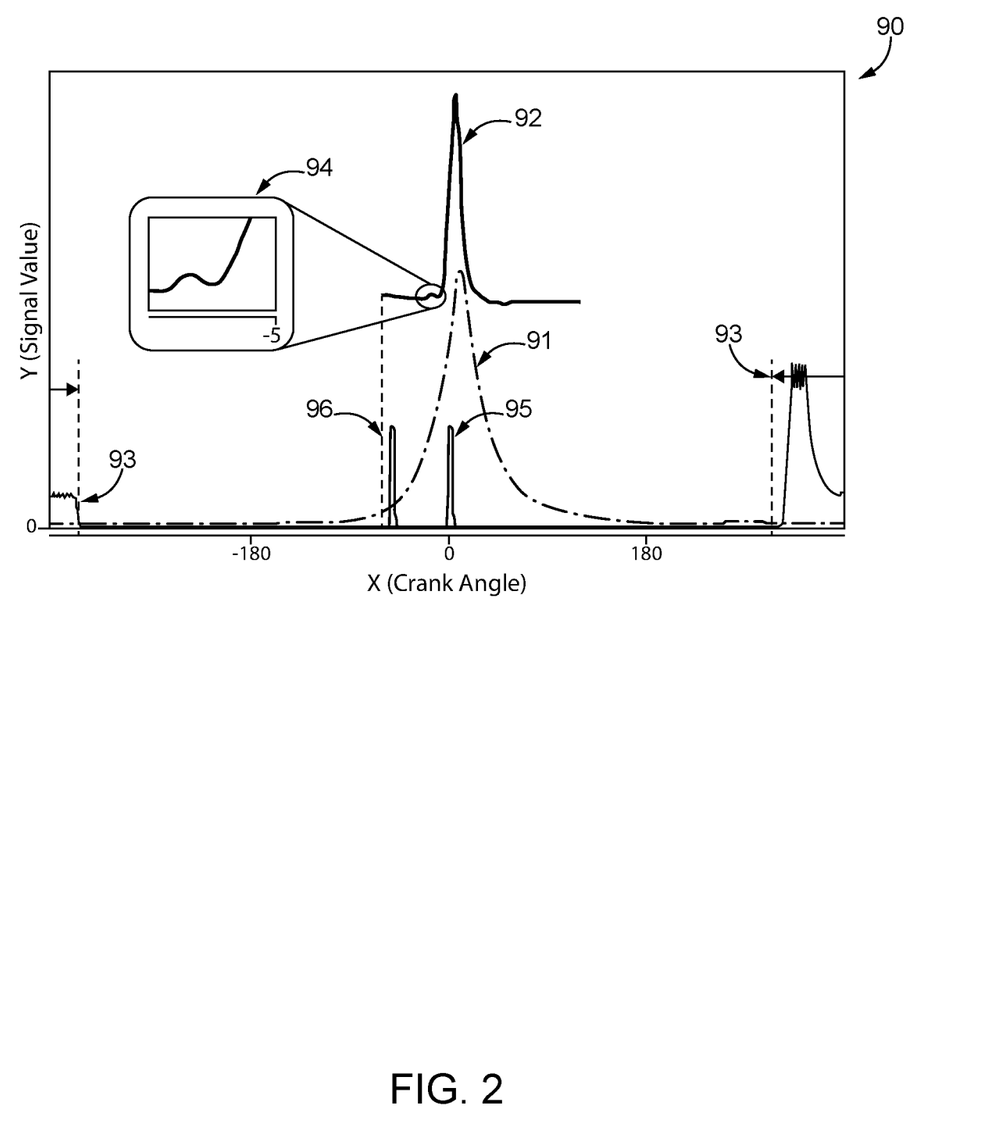
FIG. 2 is a control diagram for controlling a dual fuel engine system, according to one embodiment.
Figure 4:
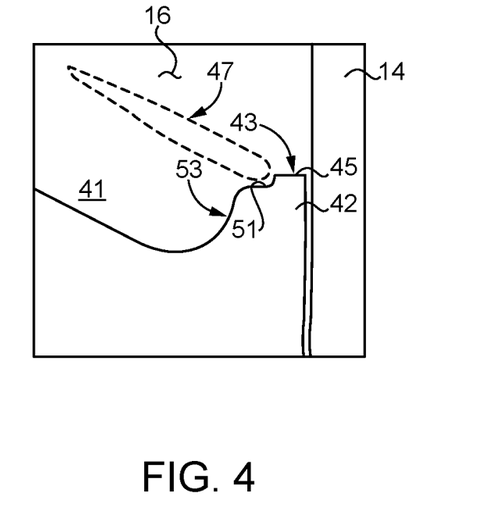
FIG. 4 is a view showing injection of an early shot of liquid fuel in an engine cycle, according to one embodiment.

Referring also now to FIG. 2, there is shown a graph 90 illustrating aspects of dual fuel operation according to one embodiment. In graph 90, crank angle is shown on the X-axis corresponding to a total of about 720° or two crank rotations. A top dead center position of piston 42 occurs at 0°. Depending on present operating strategy, intake valve closing may occur at a crank angle timing from about 70° before the TDC position of piston 42 to about 50° before the TDC position of piston 42, and in the FIG. 4 illustration occurs at about minus 60° crank angle before TDC. Signal value is shown on the Y-axis for several different operating aspects, including cylinder pressure at a curve 91, heat release at a curve 92, port fuel injection of gaseous fuel at a curve 93, and liquid fuel shots at curves 95 and 96. A detail up to about 5° prior to TDC is shown at 94. According to the present disclosure a plurality of shots of liquid fuel, for example two, can be directly injected into cylinder 16 to produce a first pilot flame and a second pilot flame that ignite in cylinder 16 and propagate from outward and inward ignition points as further discussed herein to merge, and ignite a stoichiometrically lean mixture of air and a main charge of the gaseous fuel. Shot 96 can be understood as an early shot of liquid fuel, with shot 95 being a second shot of liquid fuel. It can be noted from detail 94 that an increase in heat release based on an initial relatively slow and cool combustion, by compression-ignition, of early shot 96 is observed. It is believed that this initial, relatively slow and cool combustion of the early shot can produce a first pilot flame generally radially outward of a combustion bowl in piston 42 discussed hereinafter, and close to a periphery of cylinder 16 and piston 42, as piston 42 is traveling from its BDC position toward its TDC position. Second shot 95 can be delivered at a crank angle timing close to the TDC position of piston 42 to produce a second pilot flame that propagates in cylinder 16 to merge with the first pilot flame, and trigger conditions that rapidly ignite the lean main charge of gaseous fuel, as also further discussed herein. This general combustion approach is different from certain earlier strategies, such as so-called homogeneous charge, stratified charge, premixed charge, or others, that do not rely upon both diffusion burning and otherwise non-homogeneous charge ignition from multiple small liquid shots in order to ignite a separate gaseous fuel main charge.

Early shot 96 can be injected at a crank angle timing that follows shortly after the late intake valve closing timing, such as at about 50° before the TDC position of piston 42. It is further believed that the late intake valve closing timing assists in producing the relatively slow and cool diesel combustion to prevent aggressive combustion or knock of the main charge of gaseous fuel and produce low levels of certain emissions. The second shot may combust in a diffusion burn manner, combusting beginning at ignition points close to or at spray orifices 31 as it is injected as further discussed herein. As will be further apparent from the following description, cycle to cycle adjustments to a valve timing parameter such as the intake valve closing timing, and/or to a liquid shot delivery parameter such as liquid shot injection timing, injection amount, or a relative distribution of injection amounts between early shot 96 and second shot 95, in other words a shot-to-shot fuel split, allows combustion of the main charge to be controlled in a manner that is successful for controlling a phasing of combustion of lean mixtures at high substitution rates with a desirable emissions profile. Controlling intake valve closing timing can vary effective compression ratio as noted above, thus varying in-cylinder temperature. Such an approach avoids producing higher pressures and thus temperatures that can lead to aggressive combustion of the main gaseous fuel charge or knock and can promote desired combustion of early shot 96. As also discussed herein, the adjustments to intake valve closing timing, including an adjustment from a first late closing timing in a first engine cycle to a second late closing timing in a second engine cycle, and thus varying of in-cylinder temperature, may be based on an adjustment to the shot delivery parameter. Late intake valve closing means a closing timing occurring after the BDC position of piston 42. Other methods for varying in-cylinder temperature are contemplated such as varying boost pressure or charge air cooling. The present disclosure provides practical operating strategies that do not employ exhaust gas recirculation, however, where exhaust gas recirculation is used varying cooling of recirculated exhaust could also be employed to vary in-cylinder temperatures. From a first engine cycle to a second engine cycle, phasing of combustion can be varied based on an adjustment to at least one of the liquid shot delivery parameter or the valve timing parameter. As further discussed herein, the liquid shot delivery parameter can be adjusted from a first engine cycle to a second engine cycle based on the phasing data. The valve timing parameter can be adjusted from a first engine cycle to a second engine cycle based on the adjustment to the liquid shot delivery parameter. According to present regulatory requirements and expectations, dual fuel engine system 10 may be operated without the need for any exhaust aftertreatment to reduce oxides of nitrogen (NOx) or smoke.

Figure 3:
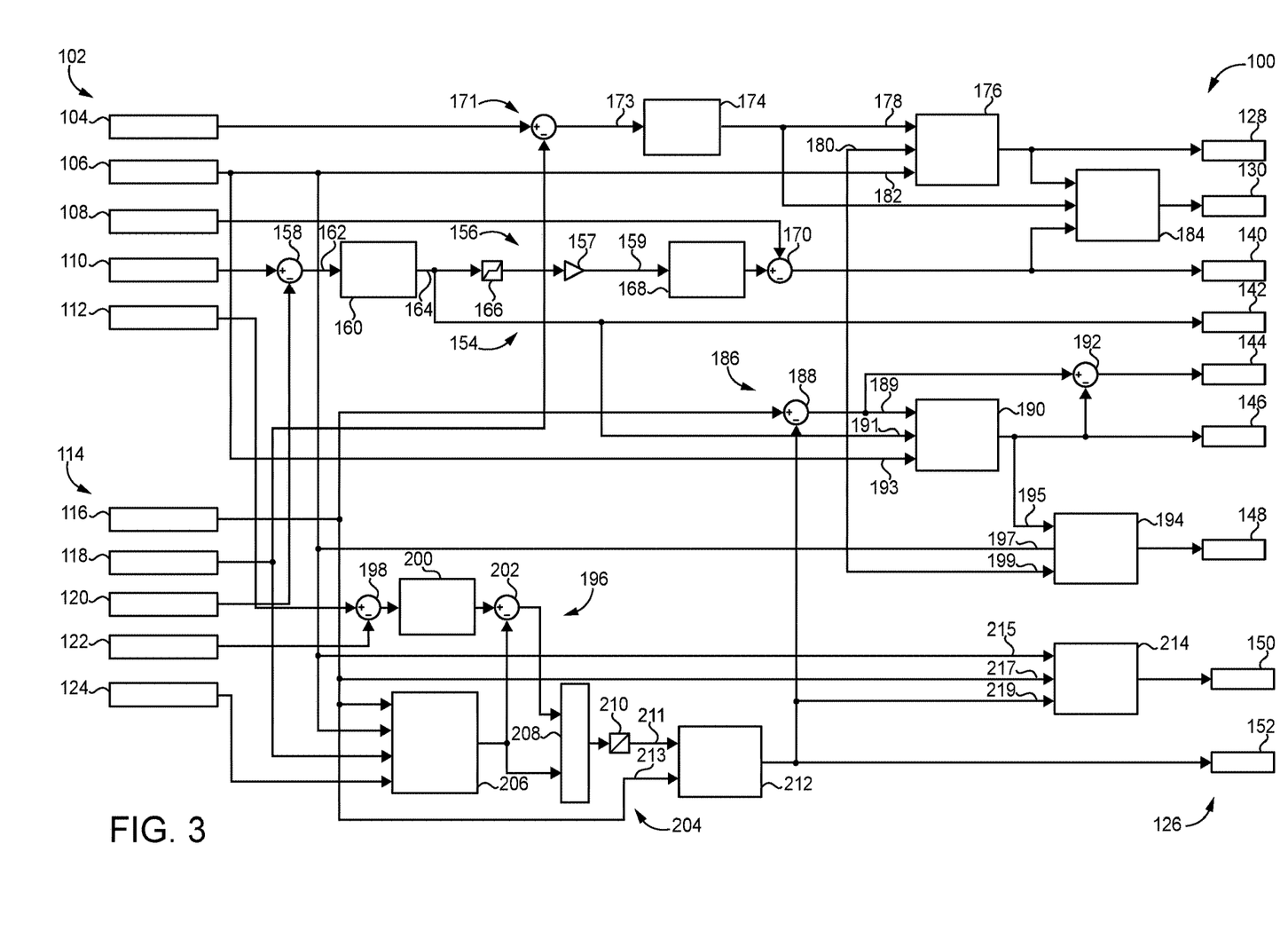
FIG. 3 is a graph illustrating combustion characteristics, according to one embodiment.

Referring also now to FIG. 3, there is shown a control diagram 100 according to one embodiment, and illustrating a plurality of control targets at 102, feedback signals and inputs at 114, and outputs or commands at 126. Control targets 102 can include a target lambda 104, a target engine speed 106, a target intake valve actuation or IVA 108, a target crank angle 50% total fuel charge burn location (CA50) 110, and a maximum peak cylinder pressure (Max-PCP) 112. Signals/inputs 114 can include a total fuel from governor input 116, a lambda input 118, CA50 input 120, a peak cylinder pressure (PCP) input 122, and an intake manifold air temperature (IMAT) input 124.

The CA50 input 120 is or includes the phasing data as discussed herein. Other targets and feedback than a crank angle 50% burn location could be used to objectively characterize phasing of combustion for the control purposes contemplated herein. Phasing of combustion includes a timing, a duration, and manner of heat release. The present disclosure contemplates a relatively faster combustion without premature ignition or knock, in comparison to known designs. As further discussed herein, phasing of combustion may be coupled to the propagation of first and second pilot flames, and to the merging of the pilot flames produced by the early shot and second shot of liquid fuel. Outputs/commands 126 can include a waste gate 1 command 128, a waste gate 2 command 130, an intake valve actuation (IVA) command 140, a second shot timing command 142, a second shot quantity command 144, an early shot quantity command 146, an early shot timing command 148, a rail pressure command 150, and a gaseous fueling command 152. Early shot quantity command 146, which could include or be the basis for an injection duration, affects a relative amount of liquid fuel allocated to the early shot and thus can vary shot-to-shot fuel split, as further discussed herein. Control diagram 100 further includes a second shot timing calculation 154, an intake valve actuation calculation 156, a peak cylinder pressure calculation 196, a gaseous fueling calculation 204, and a waste gate calculation 171. The various calculations are performed by combustion control unit 80, or multiple control units, to control combustion and combustion phasing in dual fuel engine system 10. It will be recalled that one of targets 102 is target CA50 110. Target 110 can be understood as a target crank angle at which 50% of delivered fuel, or 50% of a main charge, has been burned. An adder 158 determines a difference between target CA50 110 and an observed CA50 as indicated by signal 120, thus calculating a control term or raw error 162. A proportional control such as a PID control 160 outputs a compensated control term 164 based on raw error 162. The compensated control term 164 can be used as the basis for outputting second shot timing command 142. The compensated control term 164 can also serve as the basis for IVA command 140 in calculation 156. IVA command or valve timing command 140 can be determined, to adjust intake valve closing timing, according to a time scale different from a time scale of determining any of commands 142, 144, 146, or 148, which can each be understood as a liquid shot fueling command. Calculation 156 can include a wait cycle or dead zone 166, a gain 157, and another proportional control such as another PID control 168. An adder 170 determines a difference between the output of PID control 168 and target IVA 108. Calculation 156 can further be understood to determine an intake valve actuation error at adder 170 that serves as the basis for IVA command 140. It will be recalled that control term 164 is based on a difference or error between target CA50 110 and the observed CA50 120. IVA command 140 is thus understood to be based on a liquid shot error, which can be a second shot timing error. Still another way to understand calculations 154 and 156 is that combustion control unit 80 is adjusting a second shot timing and the other liquid shot fuel delivery parameters in a relatively faster control loop calculation, and determining a valve timing for intake valve 26, such as a valve closing timing, or adjusting another parameter that varies in-cylinder temperature, based on the second shot timing error in a relatively slower control loop calculation. Second shot timing can be used as a principal control for varying phasing of combustion and can be adjusted from one engine cycle to another. Where second shot timing error becomes too large, such as where second shot timing has drifted farther than desired from a 0° crank angle/TDC location, valve timing adjustment can bring second shot timing back closer to the TDC position of piston 42.

In addition to second shot timing serving as a basis for varying phasing of combustion, other characteristics of liquid shot delivery can be adjusted from one engine cycle to another as discussed herein to also affect phasing of combustion. Combustion control unit 80 can thus be understood to output a liquid shot fueling command, or multiple pilot fueling commands, according to a liquid shot delivery parameter that includes the at least one of a liquid shot timing, a liquid shot amount, or a liquid shot-to-shot fuel split. Typically the adjustment to the liquid shot delivery parameter will vary characteristics of each of a plurality of liquid shots simultaneously. The liquid shot timing can include a second shot timing, and the liquid shot-to-shot fuel split may be a fuel split between the second shot and the early liquid shot. Each of second shot timing and early shot timing, and liquid shot-to-shot fuel split, can be adjusted from engine cycle to engine cycle. The adjustment to each of the second shot timing and the adjustment to the early shot timing can be the same adjustment in terms of degrees of crank angle, thus these parameters are adjusted together. The liquid fueling command can be based on the phasing data produced by combustion sensor 78. Combustion control unit 80 can further be understood to output a valve timing command according to an intake valve timing parameter, which can include a late closing timing. Calculation 186 in control diagram 100 addresses the adjustment of the liquid shot delivery parameter where liquid shot-to-shot fuel split and early shot timing are adjusted from one engine cycle to another. An adder 188 receives a total fuel from governor input 116, calculates a difference between the total fuel from governor and a gas quantity calculated at 212, to produce a diesel fueling control term 189 that is input to a diesel split map 190. Diesel split map 190 also has as coordinates a second shot timing input 191, and an engine speed input 193. An output from map 190 serves as the basis for early shot quantity command 146. An adder 192 determines a difference between the early shot quantity and the diesel fuel amount to produce second shot quantity command 155. Another map 194 is used to determine early shot timing command 148 based on the early shot quantity amount, engine speed, and an intake valve closing timing as inputs 195, 197, and 199, respectively.

Calculation 196 includes an adder 198 that determines a difference between max PCP target 112 and the observed PCP 112, which difference is input to a proportional control such as a PID 200. The output of proportional control 200 and a max substitution output from a max substitution map 206 are processed at an adder 202. Max substitution map 206 calculates the max substitution rate, for example, based on input 116, target speed 106, lambda 118, and IMAT input 124. A min/max limiter 208 receives inputs from adder 202 and map 206. An output of min/max limiter 208 is processed at a rate limiter 210. Gas quantity calculation 212 can include a map calculation based on a substitution amount output 211 of rate limiter 210 and a total fuel input 213. An output of gas quantity calculation 212 serves as a basis for gas command 152.

Calculations 171 determine waste gate 1 command 128, and optionally waste gate 2 command 130 if a second waste gate and second turbine stage are used, and can include an adder 172 that determines a difference between target lambda 104 and observed lambda 118, with a lambda error 173 processed at a waste gate proportional control such as a PID 174. The output of PID control 174 can include a waste gate command term 178, which is inputted to a waste gate surge map 176 along with an intake valve closing timing input 180 and an engine speed input 182, to produce waste gate 1 command 128. Another waste gate surge map 184 determines waste gate 2 command 130 if used. By way of calculations 171, combustion control unit 80 adjusts waste gate 38 based on intake valve closing timing to ensure air to fuel ratio (AFR) remains suitable for stoichiometrically lean combustion of the main charge of gaseous fuel.

INDUSTRIAL APPLICABILITY

From the foregoing description it will be appreciated that there are a number of different control "knobs" representing different parameters that can be adjusted from one engine cycle to another to vary a phasing of combustion. It will also be recalled that differing fuel quality, such as differing methane number among different fuel blends, can affect combustion characteristics. For instance, relatively more easily compression-ignited propane present in a fuel blend of mostly methane can prematurely ignite, causing engine knock, for instance. Phasing control according to the present disclosure enables adjustments to intake valve timing such as intake valve closing as well as adjustments to liquid fuel delivery to correct or prevent excursions in phasing of combustion such as might be observed where fuel quality supplied to engine 12 changes, either because fuel supplies are deliberately shifted from one fuel supply to another, or because a supply of fuel is inconsistent in fuel quality over time. This capability is considered to provide advantages over known strategies which are often purpose built and tuned for a particular fuel quality. It will also be appreciated that such limitations respecting fuel quality may be most acute at high substitution rates.

Referring now to FIG. 4, there is shown a view of cylinder 16 as it might appear where an early shot of liquid fuel, including one of a plurality of spray jets 47, has been injected prior to completing moving piston 42 in cylinder 16 from its BDC position to its TDC position in a compression stroke of piston 42. Injection of the early shot including spray jet 47 can produce a first pilot flame based on ignition of the early shot. It can be noted that the early shot is targeted in cylinder 16 generally at a rim 43 of piston 42. A distribution of ignition points of the first pilot flame may be biased outwardly of a combustion bowl 41 in piston 42. The distribution is biased outwardly of combustion bowl 41 in that ignition of the early shot is occurring at least predominantly outward of combustion bowl 41, notwithstanding the possibility of some minor amount of the early shot igniting at other locations. In particular, the early shot may be targeted at a scooped-out region 51 of rim 43 that extends circumferentially around combustion bowl 41, and between an outer bowl surface 53 and an upper rim surface 45.

Figure 5:
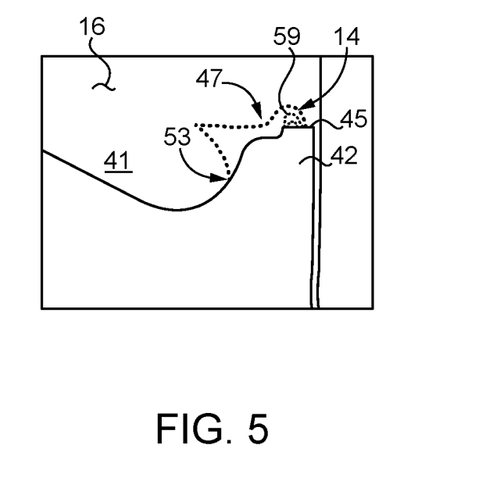
FIG. 5 is a view later in the engine cycle.
Figure 6:
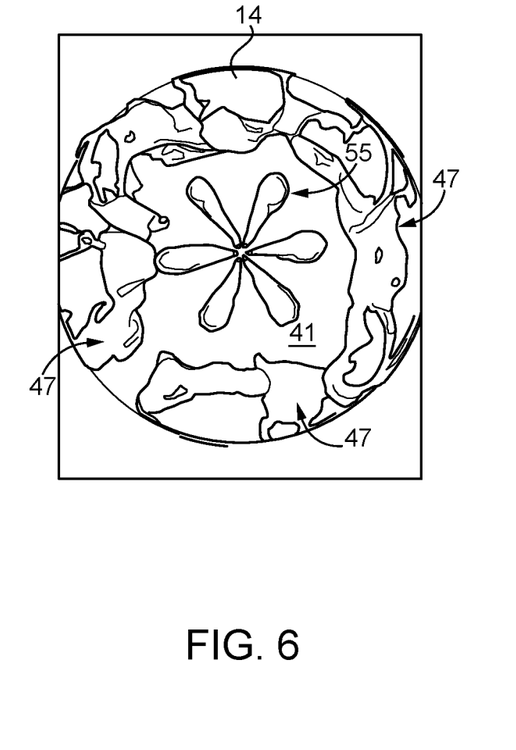
FIG. 6 is a view showing propagation of a pilot flame formed by the early shot and a second pilot flame formed by a second shot of liquid fuel in the engine cycle.
Figure 7:
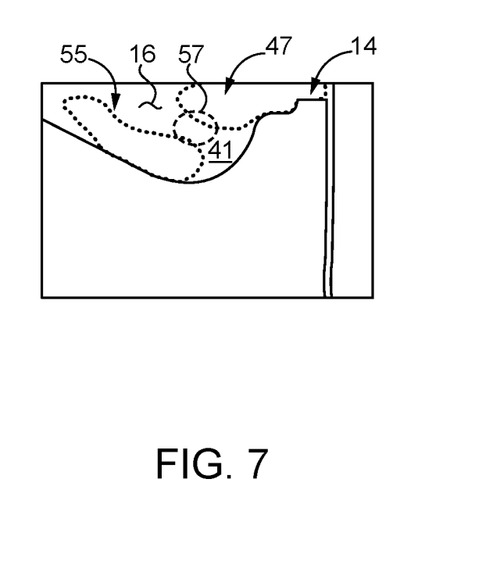
FIG. 7 is another view showing further propagation of the first and second pilot flames.

Targeting is achieved through a combination of injection spray angle, injection pressure, injection timing and other factors that will be apparent to those skilled in the art in view of the present disclosure. Injection pressure may be from about 150 MPa to about 250 MPa, typically less than 200 MPa. A distribution of ignition points of the second pilot flame is biased inwardly of the first pilot flame. Referring also to FIG. 5, there is shown a view of cylinder 16 occurring in time shortly after the view of FIG. 4, where fuel of the early shot has begun to disperse from scooped-out region 51 onto upper rim surface 45 and slightly downward into combustion bowl 41. It can be further noted that an ignition point 59 is depicted adjacent to or upon upper rim surface 45. Referring also to FIG. 6, there is shown the early shot where ignition has occurred at a plurality of ignition points generally circumferentially around combustion bowl 41, and a second shot of liquid fuel in the form of a plurality of different spray jets 55 has been injected. The depiction of FIG. 6 might occur at about a TDC position of piston 42, meaning that the timing of injection overlaps 0° crank angle, or is within a few degrees, thereof, such as about +−5° crank angle. In FIG. 7 it can be noted that the pilot flames of the early shot and the second shot have propagated toward one another, with the combusting second shot having propagated as a second pilot flame outwardly generally toward the pilot flame of the early shot such that the pilot flames are approaching one another at a location within combustion bowl 41. A flame front region 57 is identified in FIG. 7 illustrating flame fronts of the pilot flames produced by the early shot and the second shot approaching one another. From the state depicted in FIG. 7 the flame fronts merge, potentially within combustion bowl 41, although the present disclosure is not thereby limited. Merger of the pilot flames can occur at multiple locations simultaneously. Initiation of the flame fronts from geometrically different locations simultaneously contributes to a very rapid increase in pressure and temperature within cylinder 16 that hastens combustion of a main charge of gaseous fuel, in particular a stoichiometrically lean mixture of gaseous fuel and air. In this general manner, suitable targeting of the early shot and the second shot causes the first pilot flame and the second pilot flame to propagate and to merge within cylinder 16, such as within combustion bowl 41, such that a phasing of combustion of the stoichiometrically lean mixture of gaseous fuel and air is coupled to the propagation of the first pilot flame and the second pilot flame. Stated another way, since the first pilot flame and the second pilot flame propagate within cylinder 16, the timing, duration, manner and speed at which combustion of the main charge of gaseous fuel proceeds is a result of the rapid rise in pressure and temperature caused by the origination of the flame fronts from geometrically different locations. In an instance where the early pilot shot and second pilot shot are not suitably targeted in a manner that results in geometrically different origins of the first pilot flame and the second pilot flame, combustion phasing could be expected to be relatively longer in duration for instance.

Figure 8:
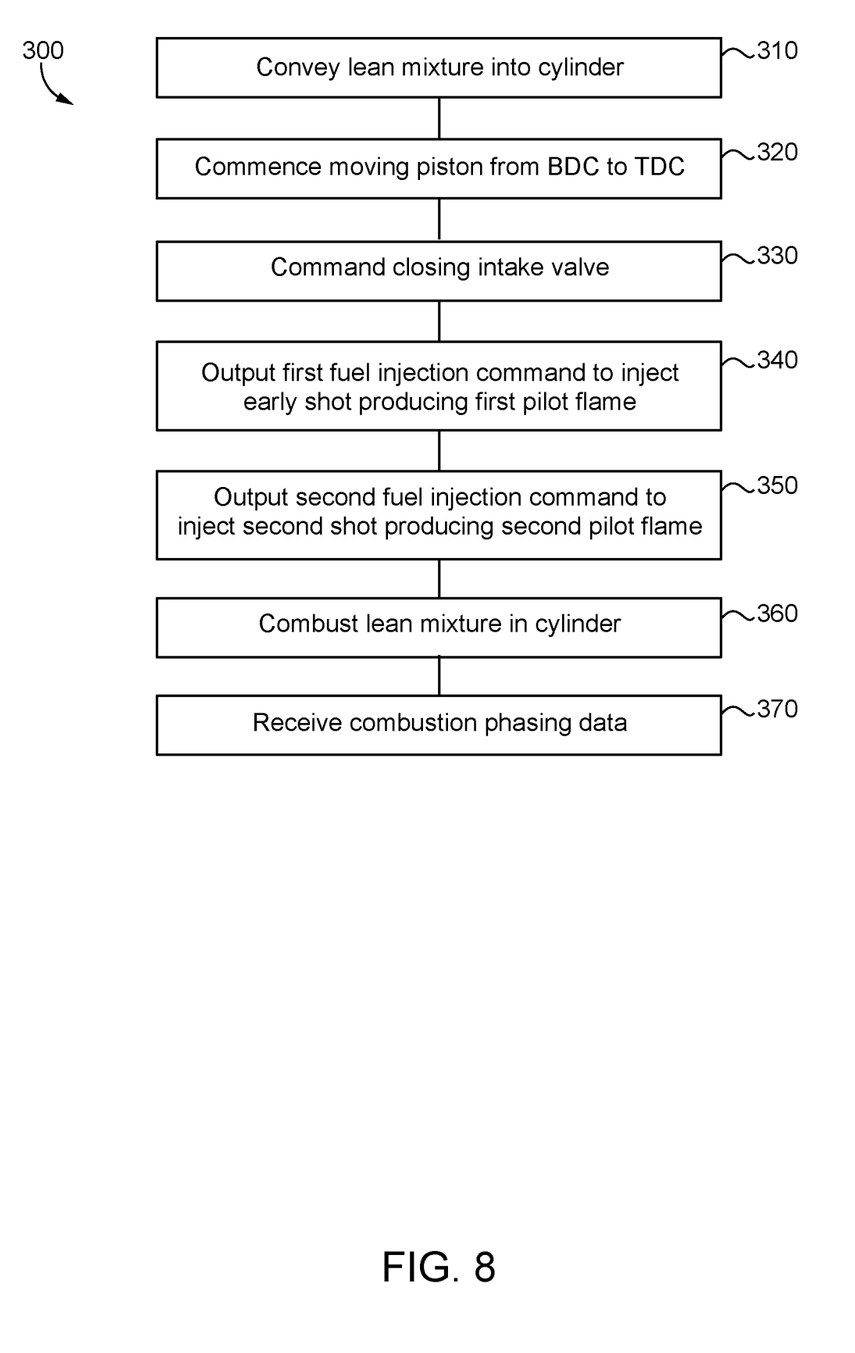
FIG. 8 is a flowchart illustrating example process and control logic flow, according to one embodiment.

Referring also now to FIG. 8, there is shown a flowchart 300 illustrating example methodology and logic flow according to one embodiment, and beginning at a block 310 where a stoichiometrically lean mixture of gaseous fuel and air is conveyed to and delivered into cylinder 16. From block 310 flowchart 300 advances to a block 320 where moving of piston 42 in cylinder 16 from a BDC position to a TDC position is commenced. From block 320, flowchart 300 advances to a block 330 where combustion control unit 80 outputs a variable valve timing command to variable valve actuator 86 to close intake valve 26 after commencing moving of piston 42 from the BDC position to the TDC position in an engine cycle. From block 330 flowchart 300 advances to a block 340 where combustion control unit 80 outputs a first fuel injection command to liquid fuel injector 74 to inject an early shot of a liquid fuel after closing of intake valve 26 and prior to completing moving piston 42 to the TDC position in the engine cycle, thus commanding production of a first pilot flame in cylinder 16. From block 340, flowchart 300 advances to a block 350 where combustion control unit 80 outputs a second fuel injection command to inject a second shot of a liquid fuel into cylinder 16 and thus command production of a second pilot flame in cylinder 16. As discussed herein, the early shot of liquid fuel is targeted at rim 43 of piston 42, and in particular may be targeted at scooped-out region 51. The second shot of liquid fuel is targeted such that the second pilot flame propagates outwardly. Targeting of the second shot of liquid fuel can include targeting the second shot of liquid fuel into combustion bowl 41. From block 350, flowchart 300 advances to a block 360 to combust the stoichiometrically lean mixture of gaseous fuel and air in cylinder 16, and thenceforth may advance to a block 370 to receive combustion phasing data, such as from sensor 78 as described herein, to responsively vary valve timing or fuel delivery parameters for later engine cycles.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having" or the like are intended to be open-ended terms. Further, the phrase "based on" is intended to mean "based, at least in part, on" unless explicitly stated otherwise.

What is claimed is:

1. A method of operating a dual fuel engine system comprising:
   moving a piston in a cylinder in a dual fuel engine from a bottom dead center (BDC) position to a top dead center (TDC) position;
   injecting an early shot of a liquid fuel into the cylinder prior to completing the moving of the piston to the TDC position;
   producing a first pilot flame based on ignition of the early shot of liquid fuel;
   targeting the early shot of liquid fuel in the cylinder such that a distribution of ignition points of the first pilot flame is biased outwardly of a combustion bowl in the piston;
   producing a second pilot flame that propagates outwardly in the cylinder to merge with the first pilot flame; and
   combusting a stoichiometrically lean mixture of a gaseous fuel and air in the cylinder in a manner responsive to the production of the first pilot flame and the second pilot flame.

2. The method of claim 1 further comprising limiting an effective compression ratio in the cylinder during the moving of the piston in the cylinder from the BDC position to the TCD position.

3. The method of claim 2 wherein the limiting of the effective compression ratio includes closing an intake valve after commencing the moving of the piston from the BDC position to the TDC position and prior to the injecting of the early shot of liquid fuel into the cylinder.

4. The method of claim 3 wherein the combusting of the stoichiometrically lean mixture of the gaseous fuel further includes hastening the combustion based on propagation of the first pilot flame and the second pilot flame from geometrically distinct ignition locations.

5. The method of claim 2 wherein the targeting of the early shot of liquid fuel further includes targeting the early shot of liquid fuel toward a scooped-out region of a rim of the piston.

6. The method of claim 2 further comprising injecting a second shot of liquid fuel into the cylinder after the injecting of the early shot to produce the second pilot flame.

7. The method of claim 6 further comprising causing, based on the targeting of the early shot of liquid fuel and a targeting of the second shot of liquid fuel, flame fronts of the second pilot flame and the first pilot flame, to merge within the combustion bowl.

8. The method of claim 6 wherein:
   the injecting of the early shot of liquid fuel includes injecting a plurality of spray jets through a set of spray orifices formed in a fuel injector nozzle within the cylinder; and the injecting of the second shot of liquid fuel includes injecting a plurality of spray jets through the same set of spray orifices formed in the fuel injector nozzle.

9. The method of claim 8 wherein:
the closing of the intake valve includes closing the intake valve at a crank angle timing from about 70° to about 50° before the TDC position of the piston; and
the injecting of the second shot includes injecting the second shot at a crank angle timing of about 0°.

10. A method of combustion in a dual fuel internal combustion engine comprising:
conveying a stoichiometrically lean mixture of a gaseous fuel and air into a cylinder in the dual fuel internal combustion engine;
injecting an early shot of a liquid fuel into the cylinder targeted at a rim of a piston during a compression stroke of the piston in the engine cycle;
injecting a second shot of liquid fuel into the cylinder after the injection of the early shot of liquid fuel;
producing a first pilot flame and a second pilot flame in the cylinder based, respectively, on ignition of the early shot of liquid fuel and the second shot of liquid fuel;
propagating the first pilot flame and the second pilot flame within the cylinder; and
combusting the stoichiometrically lean mixture of gaseous fuel and air in the cylinder according to a combustion phasing that is based on the propagation of the first pilot flame and the second pilot flame.

11. The method of claim 10 further comprising closing an intake valve for the cylinder after commencing moving the piston from a bottom dead center (BDC) position to a top dead center (TDC) position in an engine cycle and prior to the injecting of the early shot of liquid fuel.

12. The method of claim 11 wherein the closing of the intake valve includes closing the intake valve at a crank angle timing of about 60° before the TDC position of the piston, and the injecting of the early shot of liquid fuel includes injecting the early shot at crank angle timing of about 50° before the TDC position of the piston.

13. The method of claim 11 wherein flame fronts of the first pilot flame and the second pilot flame propagate to merge within the cylinder.

14. The method of claim 13 wherein the targeting of the early shot of liquid fuel includes targeting a scooped-out region of the rim of the piston, and the second shot of liquid fuel is targeted into a combustion bowl in the piston.

15. The method of claim 10 wherein the injection of the early shot of liquid fuel and the injection of the second shot of liquid fuel use the same set of spray orifices in a fuel injector nozzle.

16. The method of claim 15 wherein the spray orifices define a spray angle less than 130° and are from 3 to 6 in number.

17. A dual fuel internal combustion engine system comprising:
an engine housing having a cylinder and an intake conduit formed therein;
a piston movable within the cylinder between a bottom dead center (BCD) position and a top dead center (TDC) position, and having a rim extending circumferentially around a combustion bowl;
an intake valve movable between an open position and a closed position to fluidly connect and disconnect the cylinder with the intake conduit;
a gaseous fuel admission valve coupled with the engine housing and structured to admit a gaseous fuel for combustion in a stoichiometrically lean mixture of gaseous fuel and air in the cylinder;
an electronically controlled variable valve actuator coupled with the intake valve;
at least one electronically controlled liquid fuel injector structured to directly inject an early shot of a liquid fuel into the cylinder in an engine cycle;
a combustion control unit coupled with each of the electronically controlled variable valve actuator and the at least one electronically controlled liquid fuel injector, and the combustion control unit being structured to:
output a variable valve timing command to close the intake valve after commencing moving of the piston from the BDC position to the TDC position in an engine cycle;
command production of a first pilot flame in the cylinder by outputting a first fuel injection command to inject an early shot of liquid fuel after the closing of the intake valve and prior to completing the moving of the piston to the TDC position in the engine cycle;
command production of a second pilot flame in the cylinder by out putting a second fuel injection command to inject a second shot of a liquid fuel;
target the early shot of liquid fuel at the rim of the piston; and
target the second shot of liquid fuel within the cylinder, such that the first pilot flame and the second pilot flame propagate from outward ignition points and inward ignition points, respectively, within the cylinder.

18. The dual fuel internal combustion engine system of claim 17 wherein:
the rim includes a scooped-out region extending circumferentially around a combustion bowl; and
the combustion control unit is further structured to target the early shot of liquid fuel at the scooped-out region of the rim.

19. The dual fuel internal combustion engine of claim 18 wherein the combustion control unit is further structured to:
output the valve timing command to close the intake valve at a crank angle timing from about 50° to about 70° before the TDC position of the piston;
output the first fuel injection command to inject the early shot of liquid fuel through a set of spray orifices in a nozzle of the fuel injector after the closing of the intake valve; and
output the second fuel injection command to inject the second shot of liquid fuel at a crank angle timing of about 0°.

* * * * *